Nov. 7, 1961  KAMEO YOSHIKAWA  3,007,565
ARRANGING DEVICE OF PARTS FOR PARTS FEEDER
Filed Sept. 14, 1959  2 Sheets-Sheet 1

INVENTOR.
KAMEO YOSHIKAWA
BY *William D. Carothers*
His Attorney

Nov. 7, 1961    KAMEO YOSHIKAWA    3,007,565
ARRANGING DEVICE OF PARTS FOR PARTS FEEDER
Filed Sept. 14, 1959    2 Sheets-Sheet 2
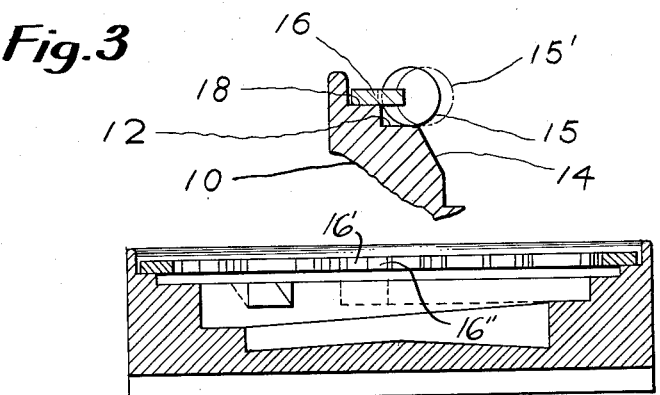
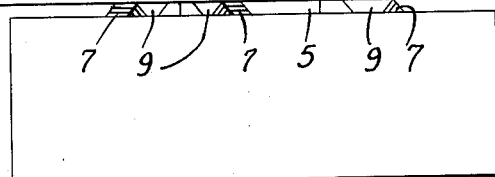
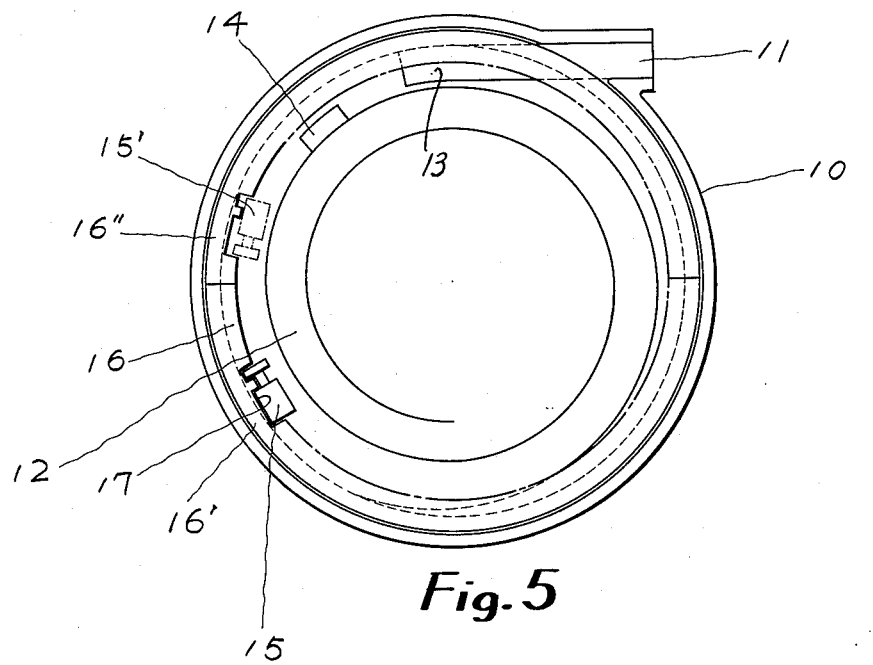
INVENTOR.
KAMEO YOSHIKAWA
BY
His Attorney

United States Patent Office 3,007,565
Patented Nov. 7, 1961

3,007,565
ARRANGING DEVICE OF PARTS FOR
PARTS FEEDER
Kameo Yoshikawa, Minamitama-gun, Tokyo, Japan, assignor to Shinko Electric Co., Ltd., Tokyo, Japan, a corporation of Japan
Filed Sept. 14, 1959, Ser. No. 839,786
2 Claims. (Cl. 198—33)

This invention relates generally to parts arranging device for parts feeders and more particularly to an independent parts driving member supported and driven by the feeding action of the parts feeder.

Hitherto, the arranging device of parts were provided on a helical track inside of the wall of the bowl of parts feeder. However, such device is extremely complicated, and further it is impossible to arrange the parts in cases where such parts have certain special features, forms.

The object of the present invention is to provide an arranging device of parts, never practiced in the past, which can arrange any parts irrespective of their features and forms.

In order to accomplish the above object, the device of the present invention comprises a ring formed plate having engaging portions adapted to the outline of the parts at a predetermined position to be fed, in a parts feeder which carries parts upwardly along the helical path provided on the inner side wall of the bowl. The device is further provided with a cut away portion near to the outlet of the above helical path for dropping out of the path the parts which are improperly oriented.

Other objects and advantages appear hereinafter in the following description and claims.

The accompanying drawings show for the purpose of exemplification without limiting this invention or the claims thereto certain practical embodiments illustrating the principles of this invention wherein:

FIG. 3 is a sectional view of FIG. 2 along the line A—A.

FIG. 4 is a view in side elevation, partly in section, showing another embodiment of this invention.

FIG. 5 is a top plan view of FIG. 4.

Figure 1:
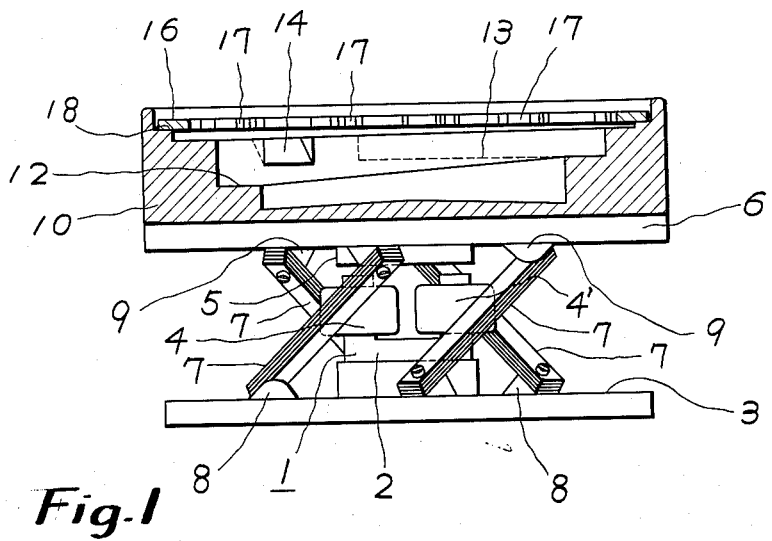
FIG. 1 shows a view in side elevation, partially in section, of the parts feeder provided with an embodiment of the device of the present invention.

In the drawings, 1 shows an electromagnet, 2 an iron core mounted on the base 3, 4 and 4' exciting coils wound on said iron core, 5 a movable iron piece, facing said iron core 2, is fixed to plate 6. 7 are springs which are fixed to seats 8 and 9, the former being provided on the base 3 and the latter being provided on the lower surface of the plate 6 and said springs being arranged inclined symmetrically to a line of symmetry around the magnet 1. 10 is a bowl fixed to the plate 6. On the upper parts of 10 an outlet 11 is formed and from the bottom to the upper part of the inside of the wall thereof a helical path or track 12 is provided, the end of which is connected to said outlet 11 through a lower step portion 13. 14 is a cut away portion provided in the helical path 12 near the step 13 and drops misaligned parts arriving thereto at an undesirable or improper orientation. 15 and 15' show examples of the parts which are cylindrically formed and have a ring formed groove each at one end thereof. 16 is a ring formed plate provided with a certain number of engaging portions adapted to the outline, at a predetermined position, of the parts to be fed, on the inside thereof. This plate is placed on a horizontal circular shelf 18, which in turn is provided at a place slightly higher than the uppermost portion of said helical path 12, on the side wall of said bowl 10. The parts fed on the bottom of the bowl 10 are led to the lowest end of said helical path 12, as in the conventional parts feeder, and are carried upwardly along said helical path. At the same time, said ring formed plate 16 rotates at a certain speed in the same direction as that of said parts, by the helical reciprocating movement of the bowl 10. Therefore, the parts 15 carried at their predetermined position to the ring formed plate 16 engage the engaging portion 17 and continue to be carried together with the ring plate 16. However, the parts, such as 15' which are improperly oriented, do not engage completely with the engaging portion 17 and pass the inner portion of the helical path 12. When these parts are carried to the portion 14 they fall to the bottom of the bowl 10 and therefore are led again to the path 12. Thus the parts which were improperly oriented may be turned and change their position at the time of falling. On the other hand the parts properly oriented to the portion 17, such as parts 15, engage completely with said portion 17 and pass the outer portion of the helical path 12. Even when these parts pass over the portion 14 the center of gravity of such parts lies on the helical path as shown in FIG. 3. Accordingly these arrive at the end of the path 12 without falling and through the lowered portion 13, thence pass to the outlet 11 disengaging with the ring formed plate 6. Thus, only properly oriented parts are fed out of the parts feeder.

Figure 2:
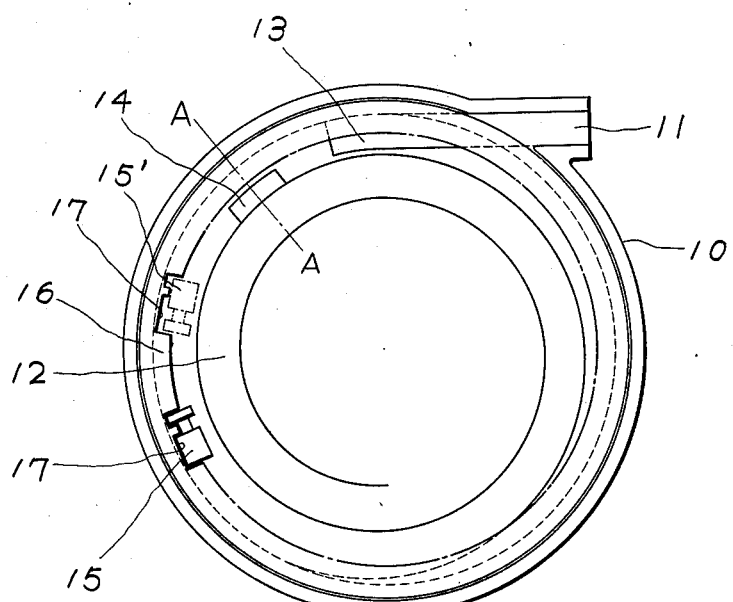
FIG. 2 shows a top plan view of FIG. 1.

FIG. 4 shows the case where the ring formed plate is sectionalized into two sections. In FIG. 4 the numbers appearing which are the same as those of FIG. 2 represent the same parts. Although the ring formed plate 16 is sectionalized into two parts, namely into 16' and 16" in FIG. 4, the same can also be sectionalized into three, four, six . . . sections. Generally the plain contact is made microscopically by three points. However, due to the fact that the finishing of a ring formed plate is difficult and cannot be finished uniformly, the distribution of the three points of contact of ring formed shelf and ring formed plate is not uniform. In case the three contact points are not distributed uniformly, the ring formed plate tends to slip against the ring formed shelf. When the ring formed plates are sectionalized into two or more sections, each section contacts the shelf with three points. The contact points are distributed to each section and further the number of contact points becomes three times the number of sections, and as the result thereof a uniform rotation can be made.

I claim:
1. An arranging device for parts in a parts feeder bowl having an upstanding wall with an inclined helical track thereon having a discharge at its upper end comprising a ring formed plate, a ring formed shelf provided on the side wall of the bowl contiguous with the uppermost portion of the helical track to support said ring formed plate, said helical track having a cut away portion near to the upper end thereof, said ring formed plate having configurations in its side adaptable to receive parts properly oriented on said helical path, said helical path being connected to the outlet of the parts feeder through a lower step under a portion of said ring formed plate, whereby the parts carried onto the said helical path which are properly oriented can be laterally received by said configurations and fed out of the bowl of parts feeder while the parts improperly oriented are dropped from said cut away portion onto the bottom of the bowl.

2. An arranging device as in claim 1, in which said ring formed plate is sectionalized into a plurality of sections.

References Cited in the file of this patent
UNITED STATES PATENTS
2,918,163    Willis _____ Dec. 22, 1959